US012040681B2

United States Patent
Tomizawa et al.

(10) Patent No.: US 12,040,681 B2
(45) Date of Patent: Jul. 16, 2024

(54) ROTARY ELECTRIC MACHINE

(71) Applicant: DENSO CORPORATION, Kariya (JP)

(72) Inventors: Hiroki Tomizawa, Kariya (JP); Asuka Tanaka, Kariya (JP); Masashi Yamasaki, Kariya (JP); Takamasa Mutou, Kariya (JP); Yasuaki Koyano, Kariya (JP); Hisashi Yamamoto, Kariya (JP); Yusuke Shikata, Kariya (JP)

(73) Assignee: DENSO CORPORATION, Kariya (JP)

( * ) Notice: Subject to any disclaimer, the term of this patent is extended or adjusted under 35 U.S.C. 154(b) by 254 days.

(21) Appl. No.: 17/660,811

(22) Filed: Apr. 26, 2022

(65) Prior Publication Data
US 2022/0255398 A1 Aug. 11, 2022

Related U.S. Application Data

(63) Continuation of application No. PCT/JP2020/039083, filed on Oct. 16, 2020.

(30) Foreign Application Priority Data
Oct. 29, 2019 (JP) ................................. 2019-195785

(51) Int. Cl.
*H02K 5/22* (2006.01)
*H02K 5/173* (2006.01)
(Continued)

(52) U.S. Cl.
CPC ............ *H02K 5/26* (2013.01); *H02K 5/1732* (2013.01); *H02K 5/225* (2013.01); *H02K 7/083* (2013.01);
(Continued)

(58) Field of Classification Search
CPC ........... H02K 9/00; H02K 9/22; H02K 9/227; H02K 5/00; H02K 5/04; H02K 5/17;
(Continued)

(56) References Cited

U.S. PATENT DOCUMENTS

| 10,113,538 B1* | 10/2018 | Gieseke | F04B 9/06 |
| 2002/0158527 A1* | 10/2002 | Kawakami | H02K 5/148 |
| | | | 310/78 |

(Continued)

FOREIGN PATENT DOCUMENTS

| JP | H08-252783 A | 10/1996 |
| JP | 2012-161856 A | 8/2012 |

(Continued)

*Primary Examiner* — Tran N Nguyen
(74) *Attorney, Agent, or Firm* — MASCHOFF BRENNAN

(57) ABSTRACT

A housing is shaped in a bottomed tubular form. A stator is fixed to a stator receiving portion of a tubular portion of the housing at an arbitrary angle position around an axis of the tubular portion. A heat sink is fixed to a heat sink fixing portion of the tubular portion at an arbitrary angle position around the axis of the tubular portion. A control device includes a connector for electrically connecting with an external device and is configured to control energization of the stator. Each of a plurality of externally mounting portions is a part of a bottom portion of the housing and is formed integrally with the housing in one-piece. A plurality of housing positioning holes are formed at the bottom portion of the housing and are arranged at equal intervals along a circle that is concentric with the tubular portion.

9 Claims, 18 Drawing Sheets

(51) Int. Cl.
*H02K 5/26* (2006.01)
*H02K 7/08* (2006.01)
*H02K 7/10* (2006.01)
*H02K 7/116* (2006.01)
*H02K 9/22* (2006.01)
*H02K 11/33* (2016.01)

(52) U.S. Cl.
CPC ........... *H02K 7/1004* (2013.01); *H02K 7/116* (2013.01); *H02K 9/227* (2021.01); *H02K 11/33* (2016.01); *H02K 2207/03* (2013.01)

(58) Field of Classification Search
CPC ........ H02K 5/1732; H02K 5/22; H02K 5/225; H02K 5/26; H02K 7/00; H02K 7/08; H02K 7/083; H02K 7/10; H02K 7/10; H02K 7/1004; H02K 7/11; H02K 7/116; H02K 7/14; H02K 11/00; H02K 11/33
See application file for complete search history.

(56) References Cited

U.S. PATENT DOCUMENTS

2012/0161559 A1* 6/2012 Mizutani .............. H02K 7/1166
310/71
2020/0195099 A1 6/2020 Takahashi et al.

FOREIGN PATENT DOCUMENTS

| JP | 2015-208052 A | 11/2015 |
| JP | 2016-136829 A | 7/2016 |
| JP | 2016-186224 A | 10/2016 |

* cited by examiner

ROTARY ELECTRIC MACHINE

CROSS REFERENCE TO RELATED APPLICATIONS

This application is a continuation application of International Patent Application No. PCT/JP2020/039083 filed on Oct. 16, 2020, which designated the U.S. and claims the benefit of priority from Japanese Patent Application No. 2019-195785 filed on Oct. 29, 2019. The entire disclosures of all of the above applications are incorporated herein by reference.

TECHNICAL FIELD

The present disclosure relates to a rotary electric machine.

BACKGROUND

A permissible space, which can be used for mounting a rotary electric machine, differs depending on a type of external device to which the rotary electric machine is mounted. Therefore, it is desirable to minimize the number of protrusions of the rotary electric machine and to give a high degree of freedom in a relative angle around an axis of a housing of the rotary electric machine between an externally mounting portion of the housing and a connector of the rotary electric machine.

For example, in one previously proposed rotary electric machine, a plurality of externally mounting portions and a tubular portion of the housing are formed integrally in one-piece. Furthermore, a heat sink and a stator are press fitted to the tubular portion of the housing, and thereby it is not necessary to provide a dedicated fixing member which fixes the stator or the like.

SUMMARY

This section provides a general summary of the disclosure, and is not a comprehensive disclosure of its full scope or all of its features.

According to the present disclosure, there is provided a rotary electric machine that includes a housing shaped in a bottomed tubular form. A plurality of housing positioning holes are formed at a bottom portion of the housing and are arranged at equal intervals along a circle that is concentric with a tubular portion of the housing.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
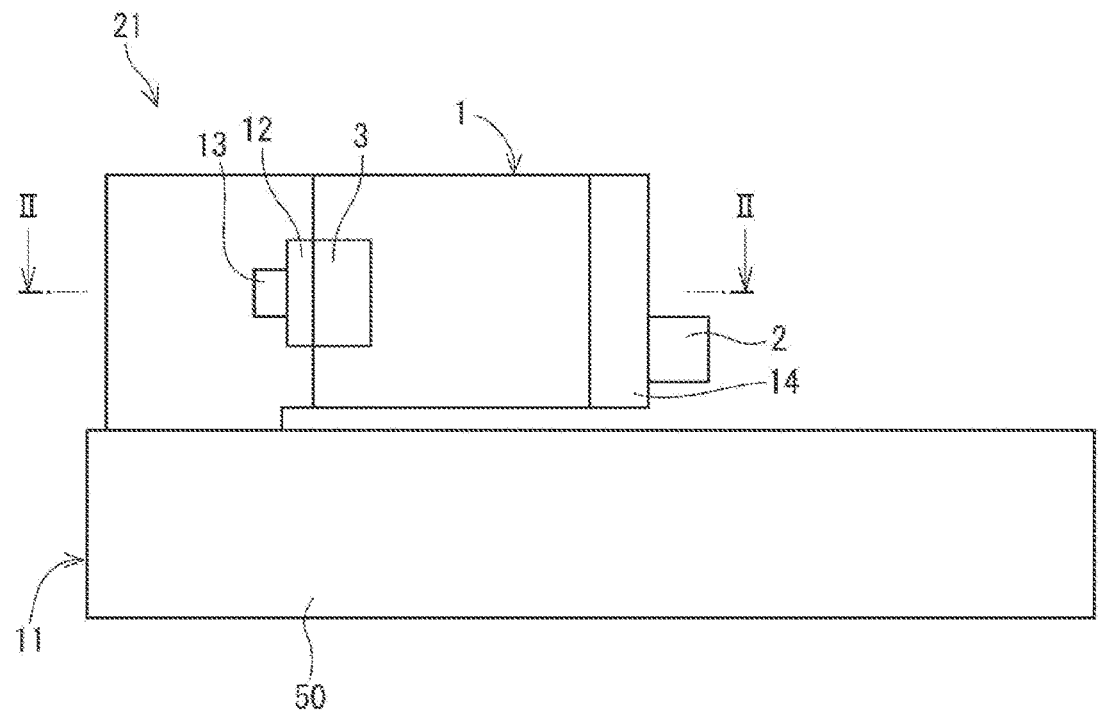
FIG. 1 is a schematic view of a rotary electric machine and a rack gear according to a first embodiment.

A permissible space, which can be used for mounting a rotary electric machine, differs depending on a type of external device to which the rotary electric machine is mounted. Therefore, it is desirable to minimize the number of protrusions of the rotary electric machine and to give a high degree of freedom in a relative angle around an axis of a housing of the rotary electric machine between an externally mounting portion of the housing and a connector of the rotary electric machine.

For example, in one previously proposed rotary electric machine, a plurality of externally mounting portions and a tubular portion of the housing are formed integrally in one-piece. Furthermore, a heat sink and a stator are press fitted to the tubular portion of the housing, and thereby it is not necessary to provide a dedicated fixing member which fixes the stator or the like.

The disclosing party of the present disclosure believes that by fixing the heat sink and the stator to the housing, a high degree of freedom can be implemented for the relative angle between the externally mounting portions of the housing and the connectors. Thereby, the relative angle can be changed according to the model of rotary electric machine to implement the high degree of mounting freedom.

However, when the degree of freedom with respect to the relative angle is high, a manufacturing facility for the assembling step becomes complicated, and thereby the manufacturing becomes difficult. For example, in order to assemble the components, such as the stator and the connectors, in such a manner that the relative angle between the components is variable according to the model of rotary electric machine, a rotating mechanism is required at each manufacturing facility, and thereby the manufacturing facility becomes expensive and complicated.

Furthermore, for example, in order to assemble the components in such a manner that the relative angle of the housing is variable according to the model of rotary electric machine, the housing needs to be fixed at an arbitrary relative angle position. In general, the relative angle position of the housing is fixed by chucking the externally mounting portions, which project from the tubular portion of the housing, or by inserting pins into externally mounting holes of the housing. However, a shape, a size and a position of each externally mounting portion and each externally mounting hole vary depending on the model of rotary electric machine. Therefore, when trying to support all models of rotary electric machines, variations of fixing jigs for relative angle positions in each assembling device are increased, and it takes time to set up, resulting in inefficiency.

A rotary electric machine of the present disclosure includes a housing shaped in a bottomed tubular form, a stator, a heat sink, a control device, an externally mounting portion and a plurality of housing positioning holes.

The stator is fixed to a stator receiving portion, which is formed at an inner wall of a tubular portion of the housing, at an arbitrary angle position around an axis of the tubular portion. The heat sink is fixed to a heat sink fixing portion, which is formed at the inner wall of the tubular portion of the housing, at an arbitrary angle position around the axis of the tubular portion.

The control device includes a connector for electrically connecting with an external device and is configured to control energization of the stator. The externally mounting portion is a part of a bottom portion of the housing and is formed integrally with the housing in one-piece. The plurality of housing positioning holes are formed at the bottom portion and are arranged at equal intervals along a circle that is concentric with the tubular portion.

In the present disclosure, since the externally mounting portion and the housing are formed integrally in one-piece, a dedicated fixing member, which fixes the externally mounting portion to the housing, is not required. Furthermore, since the heat sink and the stator are fixed at the inside of the housing, it is not required to provide a dedicated fixing member, which fixes the stator or the like. Therefore, the number of the projections, which project at the outside of the housing, is reduced.

Furthermore, since the housing is shaped in the tubular form, a silhouette of the housing does not change even when the housing is rotated. Furthermore, each of the heat sink and the stator is fixed to the housing at the arbitrary relative angle position, so that there is the high degree of freedom in the corresponding relative angle between the gear-side mounting portion and the connector. Therefore, it is possible to increase the degree of mounting freedom of the rotary electric machine.

Furthermore, according to the present disclosure, the bottom portion of the housing includes the plurality of housing positioning holes arranged at the equal intervals along the circle that is concentric with the tubular portion. A Jig, which fixes the housing at the manufacturing process, can be used commonly among the various models of rotary electric machines by commonly setting the plurality of housing positioning holes regardless of the model of rotary electric machine to be assembled.

For example, at a cutting step of the housing, a chuck jig can be used commonly among the various models of rotary electric machines by using the plurality of housing positioning holes to position the housing in a circumferential direction.

At an assembling step for assembling the components to, for example, the housing, the housing is positioned in a rotational direction by fitting the plurality of housing positioning holes to positioning pins while using a pallet that enables fixation of the positioning pins relative to a mounting base, to which the pallet is mounted, at an arbitrary relative angle position. Thus, the pallet can be used commonly among the various models of rotary electric machines. After the housing is fixed to the pallet at the arbitrary relative angle position that corresponds to the model of rotary electric machine to be assembled, the pallet is transferred to each assembling facility to assemble and process each corresponding component. At each assembling facility, the housing and each corresponding component are not rotated.

By providing the rotating mechanism described above to the pallet, the rotating mechanism and the drive force are not required at the assembling facility, so that the assembling facility can have the structure that can be easily adjusted and can be low cost. Furthermore, it is only required to fix the relative angle position of the housing only at the time of starting the assembling step, and the pallet does not need to have the drive force for rotating the pallet. Thus, the pallet can have the structure that is simple and is low cost.

As described above, according to the rotary electric machine of the present disclosure, it is possible to change the corresponding relative angle between the externally mounting portion and the connector while limiting the complication in the setup at the manufacturing facility. Thus, it is possible to provide the rotary electric machine that has the high degree of mounting freedom and can be easily manufactured.

Hereinafter, embodiments of a rotary electric machine will be described with reference to the drawings. The same reference signs are given to substantially the same components among the embodiments, and the redundant description thereof will be omitted.

First Embodiment

Figure 2:
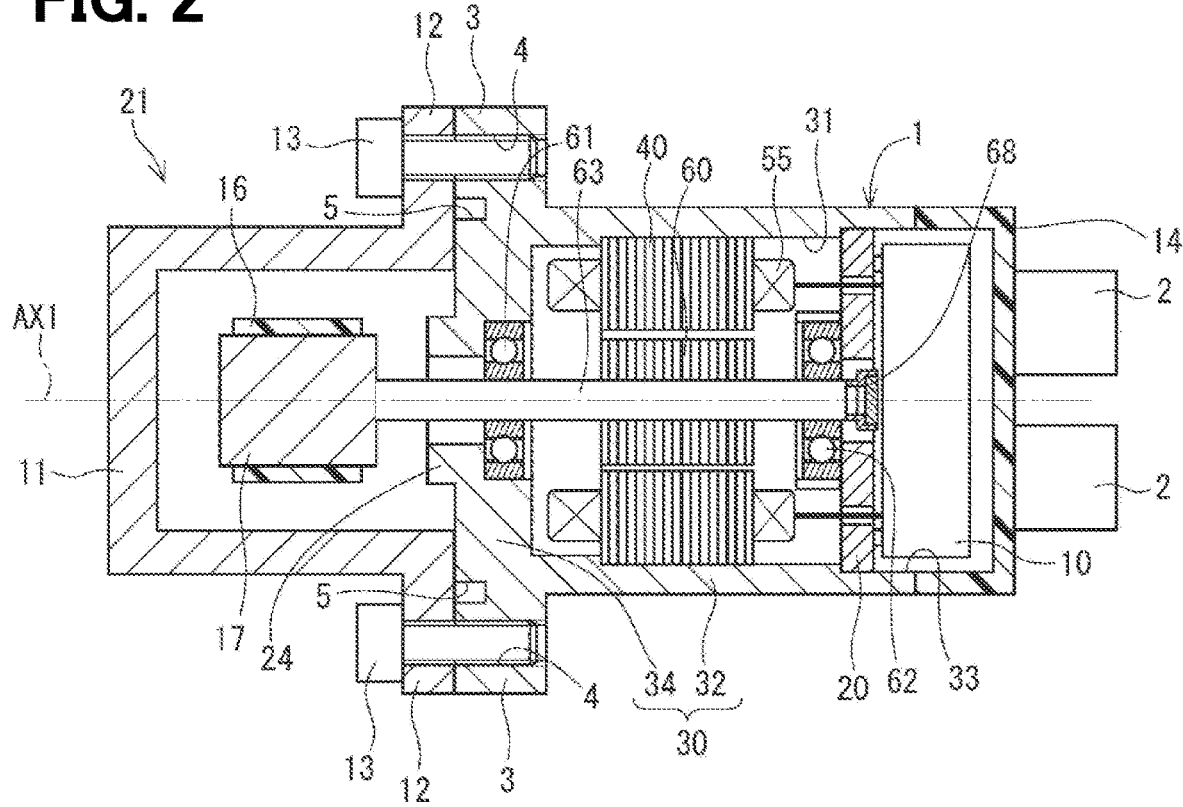
FIG. 2 is a cross-sectional view taken along line II-II in FIG. 1, showing the rotary electric machine and the rack gear of FIG. 1.

As shown in FIG. 1, a rotary electric machine 1 of a first embodiment is used as a steering assist torque motor for an electric power steering apparatus to transmit a drive force to a rack gear 50. As shown in FIG. 2, a torque of the rotary electric machine 1 in a rack gear drive device 21 is transmitted from a small diameter pulley 17, which is fixed to a shaft 63 of the rotary electric machine 1, to a large diameter pulley, which is installed to a rack shaft (not shown), through a belt 16.

The small diameter pulley 17, the belt 16, the large diameter pulley and the rack gear 50 described above are received in a gear housing 11. As shown in FIGS. 1 and 2, the gear housing 11 includes a plurality of rotary electric machine mounting portions 12. Furthermore, a housing 30 of the rotary electric machine 1 includes a plurality of gear-side mounting portions 3. Each of the gear-side mounting portions 3 corresponds to an externally mounting portion. Each of the rotary electric machine mounting portions 12 and a corresponding one of the gear-side mounting portions 3 are fixed together by a bolt 13.

Figure 3:
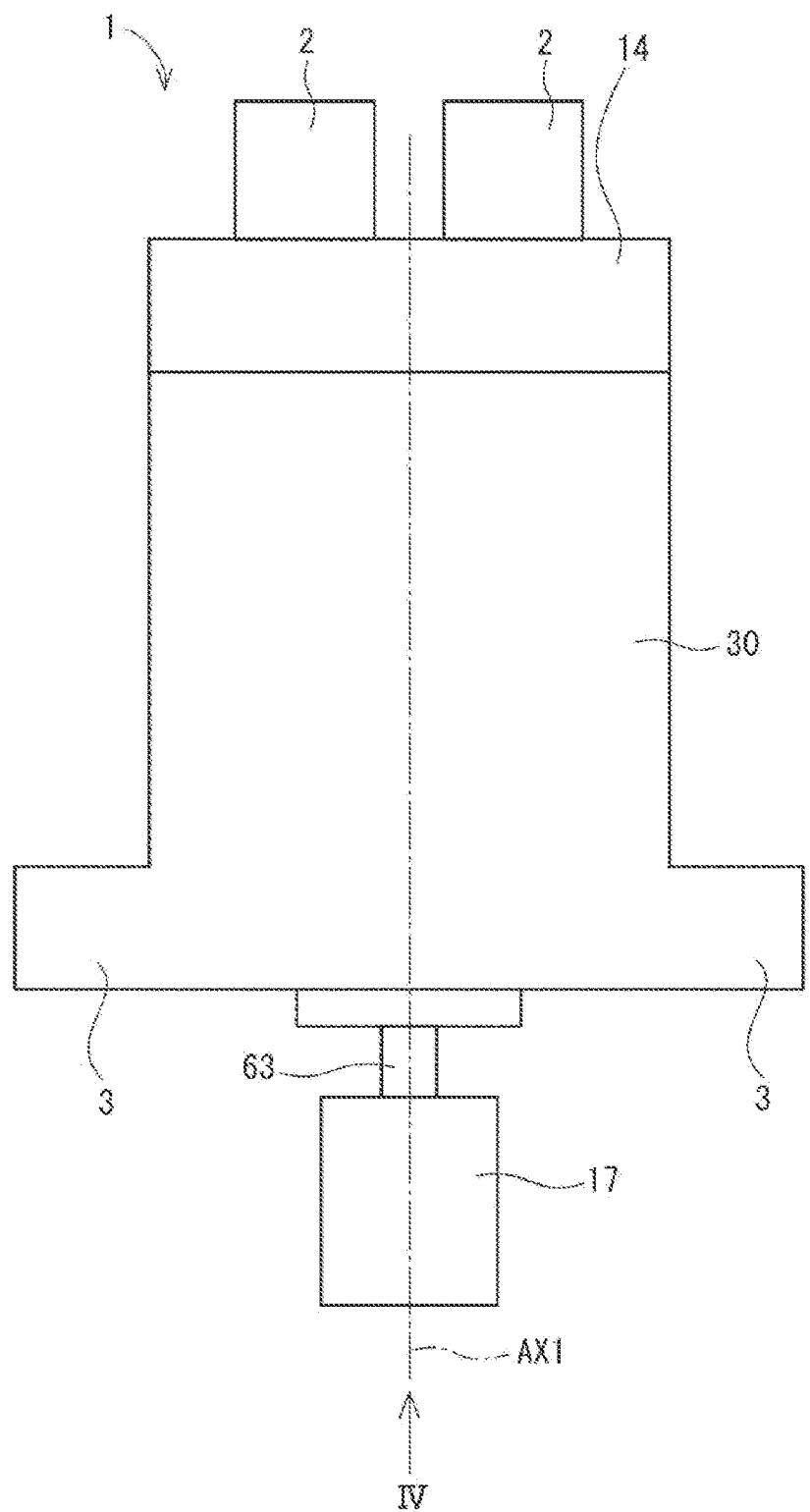
FIG. 3 is a side view of the rotary electric machine of FIG. 1.

An overall structure of the rotary electric machine 1 will be described with reference to FIGS. 3 and 5. The rotary electric machine 1 includes a motor unit 80 at one side of the rotary electric machine 1 in an axial direction. The rotary electric machine 1 is formed as an electromechanically integrated rotary electric machine in which an ECU (i.e., a control device) 10 is integrally provided at the other side in the axial direction. Hereinafter, an output shaft side of the motor unit 80, which is indicated at a lower side of FIG. 5, will be referred to as a front side, a cover 14 side, which is indicated at an upper side of FIG. 5, will be referred to as a rear side.

The motor unit 80 includes the housing 30, a stator 40 and a rotor 60. The stator 40 is fixed by shrink fitting to a stator receiving portion 31, which is formed at an inner wall of a tubular portion 32 of the housing 30.

The housing 30 is shaped in a bottomed tubular form (more specifically, a bottomed cylindrical tubular form) and includes the tubular portion 32 and a bottom portion 34. The housing 30 includes an opening 33 at the rear side of the housing 30. The bottom portion 34 includes a ring-shaped projection 24 that is coaxial with the tubular portion 32. The ring-shaped projection 24 is located on a radially inner side of a plurality of housing positioning holes 5 and axially projects from the bottom portion 34 toward an opposite side that is opposite to the tubular portion 32. Hereinafter, an end portion of the tubular portion 32, which is located adjacent to the bottom portion 34, will be referred to as a bottom-side end portion 35.

A front bearing 61 rotatably supports the shaft 63 at the front side in the axial direction. At the front side of the tubular portion 32, the gear-side mounting portions 3 are located on a radially outer side of the tubular portion 32. The housing 30 and the gear-side mounting portions 3 are formed integrally in one-piece.

Figure 4:
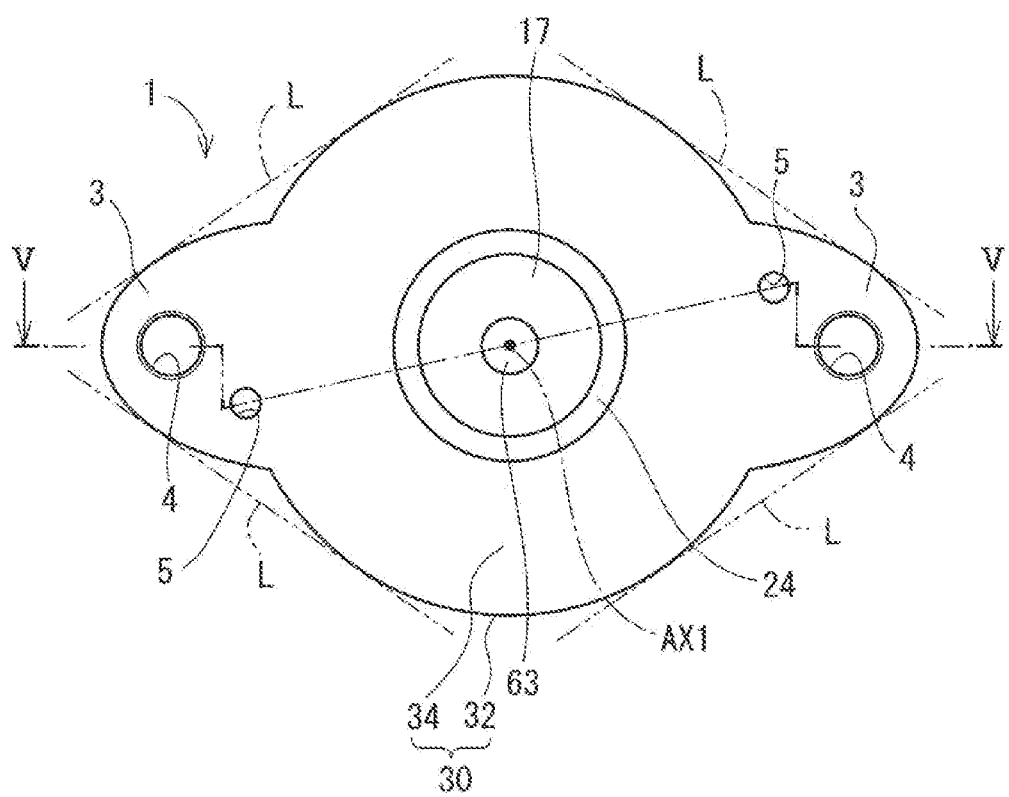
FIG. 4 is a view in a direction of an arrow IV in FIG. 3, showing the rotary electric machine of FIG. 3.

As shown in FIG. 4, the bottom portion 34 includes the gear-side mounting portions 3. The number of the gear-side mounting portions 3 is two, and these two gear-side mounting portions 3 radially outwardly project from the tubular portion 32 at two locations and are opposed to each other. Each of the gear-side mounting portions 3 includes a gear-side mounting hole 4 as a hole for mounting the rotary electric machine 1 to the gear side (more specifically, the gear housing 11). The gear-side mounting hole 4 extends through the gear-side mounting portion 3 in the axial direction. The gear-side mounting holes 4 are arranged along a circle that is concentric with the tubular portion 32 such that the gear-side mounting holes 4 are opposed to each other. At the time of fixing the rotary electric machine mounting portions 12 and the gear-side mounting portions 3 together, the bolts 13 are threadably fitted into the gear-side mounting holes 4, respectively. Furthermore, the number of the housing positioning holes 5 is two, and these two housing positioning holes 5 are formed at the bottom portion 34.

These two housing positioning holes 5 are formed at the bottom portion 34 of the housing 30 at two locations that are opposed to each other and are circumferentially displaced from each other by 180 degrees. Each of the housing positioning holes 5 is formed by using a corresponding one of the gear-side mounting portions 3 that radially outwardly project from the tubular portion 32 of the housing 30. Furthermore, the housing positioning holes 5 are arranged at equal intervals along a circle that is concentric with the tubular portion 32 of the housing 30. In an axial view of the bottom portion 34 viewed in the axial direction, each of the housing positioning holes 5 is located on a side of a corresponding common tangent line L, at which an axis of the tubular portion 32 (i.e., a rotational axis AX1 of the motor unit) is placed, while the corresponding common tangent line L is tangent to and is common to both of the tubular portion 32 and an adjacent one of the gear-side mounting portions 3 which is adjacent to the housing positioning hole 5.

Figure 11:
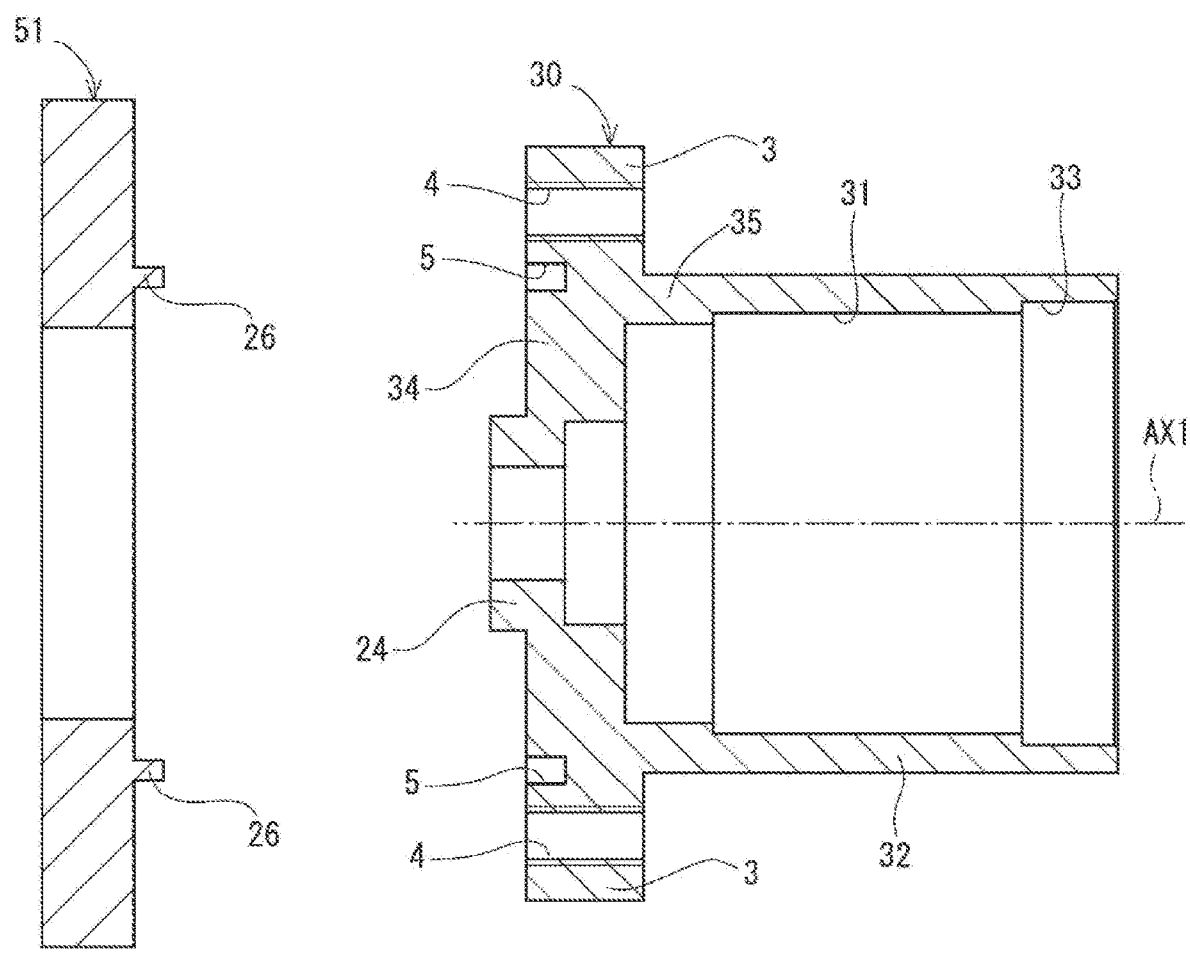
FIG. 11 is a cross-sectional view showing the housing of the first embodiment and a chuck jig used in a cutting step of boring a hole having a corresponding inner diameter at the housing.
Figure 12:
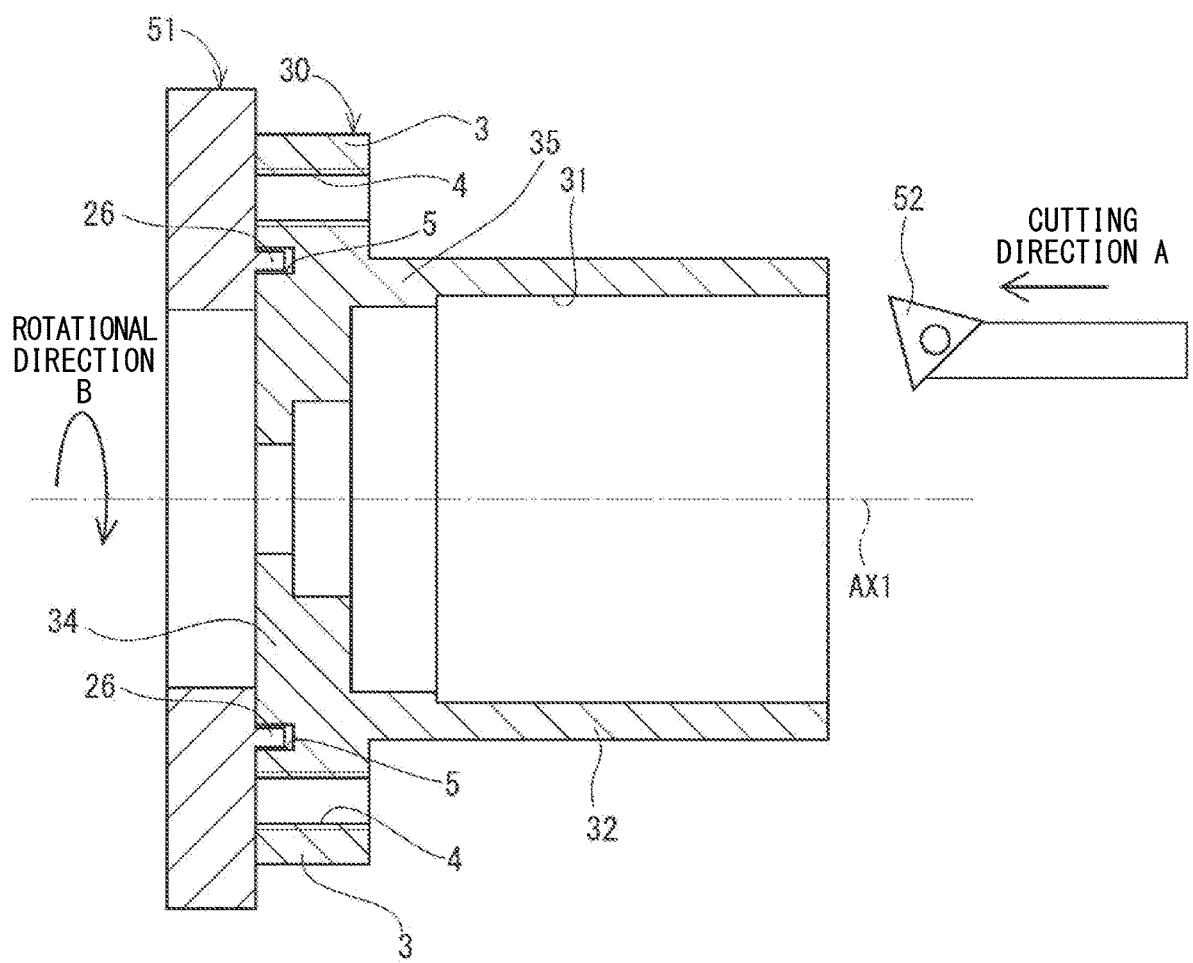
FIG. 12 is a cross-sectional view showing a state in which the housing of the first embodiment is set on the chuck jig.
Figure 13:
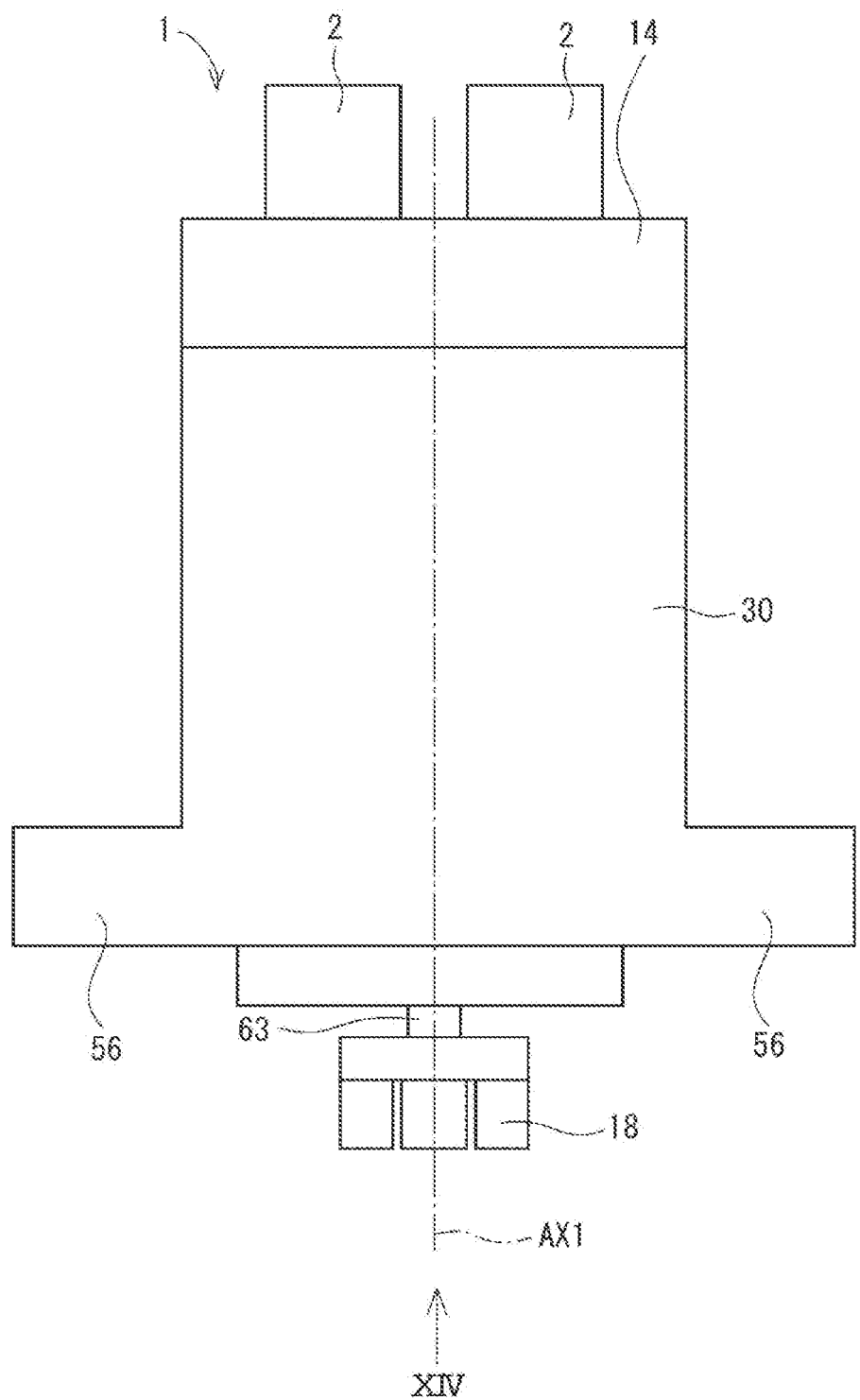
FIG. 13 is a side view of a rotary electric machine according to a second modification of the first embodiment.
Figure 14:
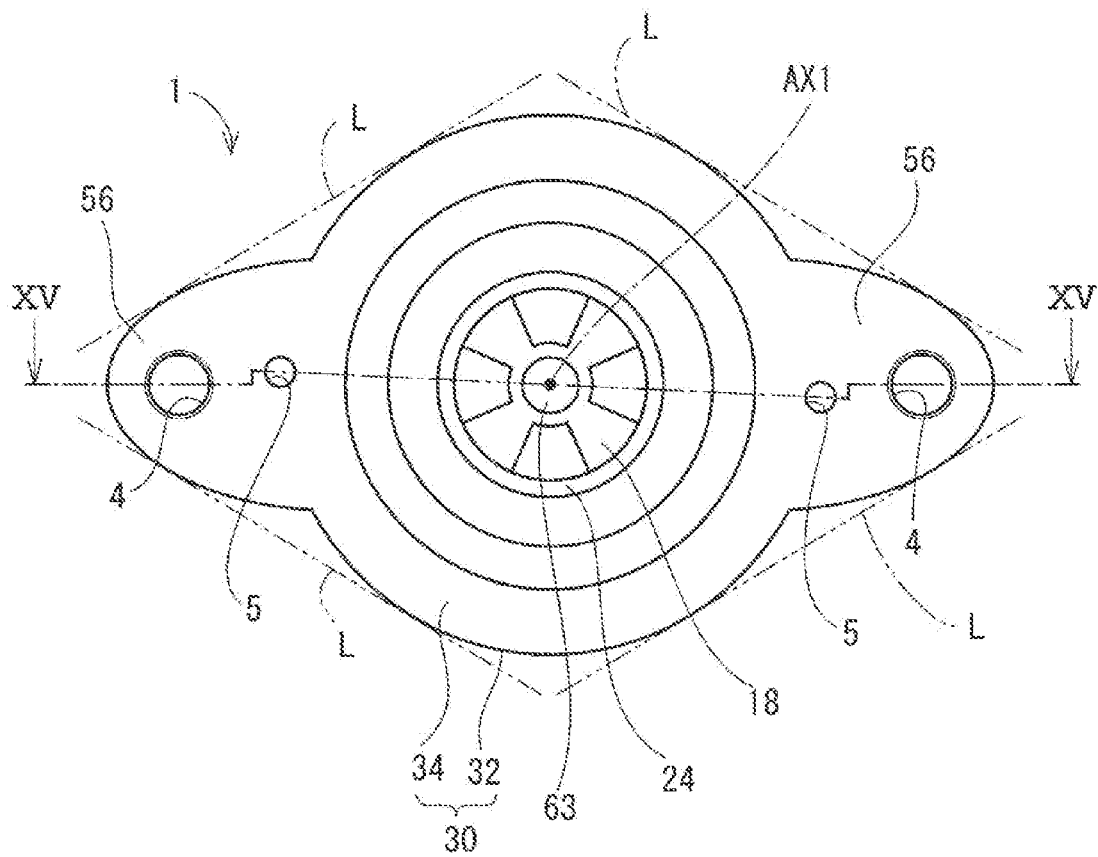
FIG. 14 is a view in a direction of an arrow XIV in FIG. 13, showing the rotary electric machine of FIG. 13.
Figure 15:
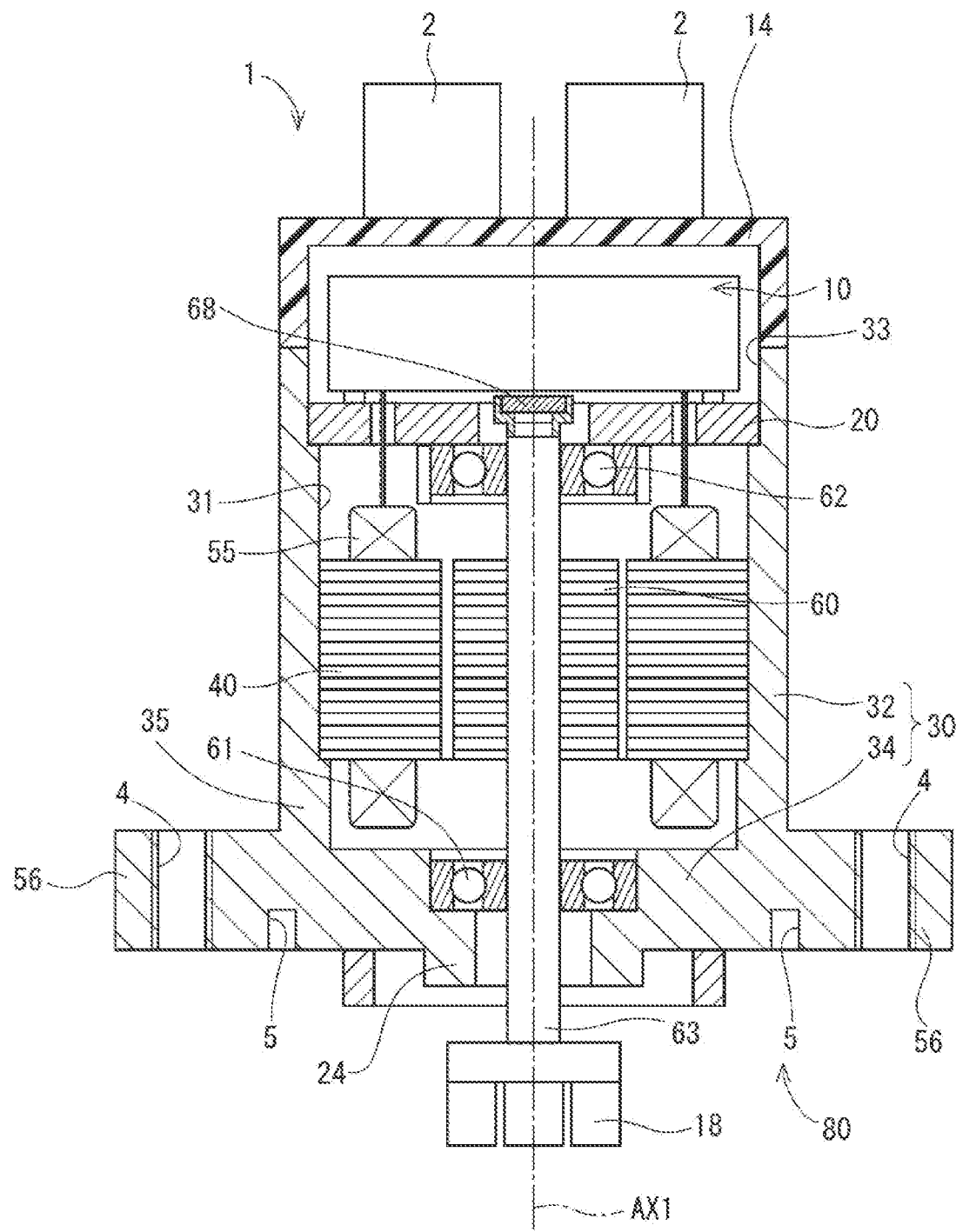
FIG. 15 is a cross-sectional view taken along line XV-XV in FIG. 14, showing the rotary electric machine of FIG. 14.
Figure 16:
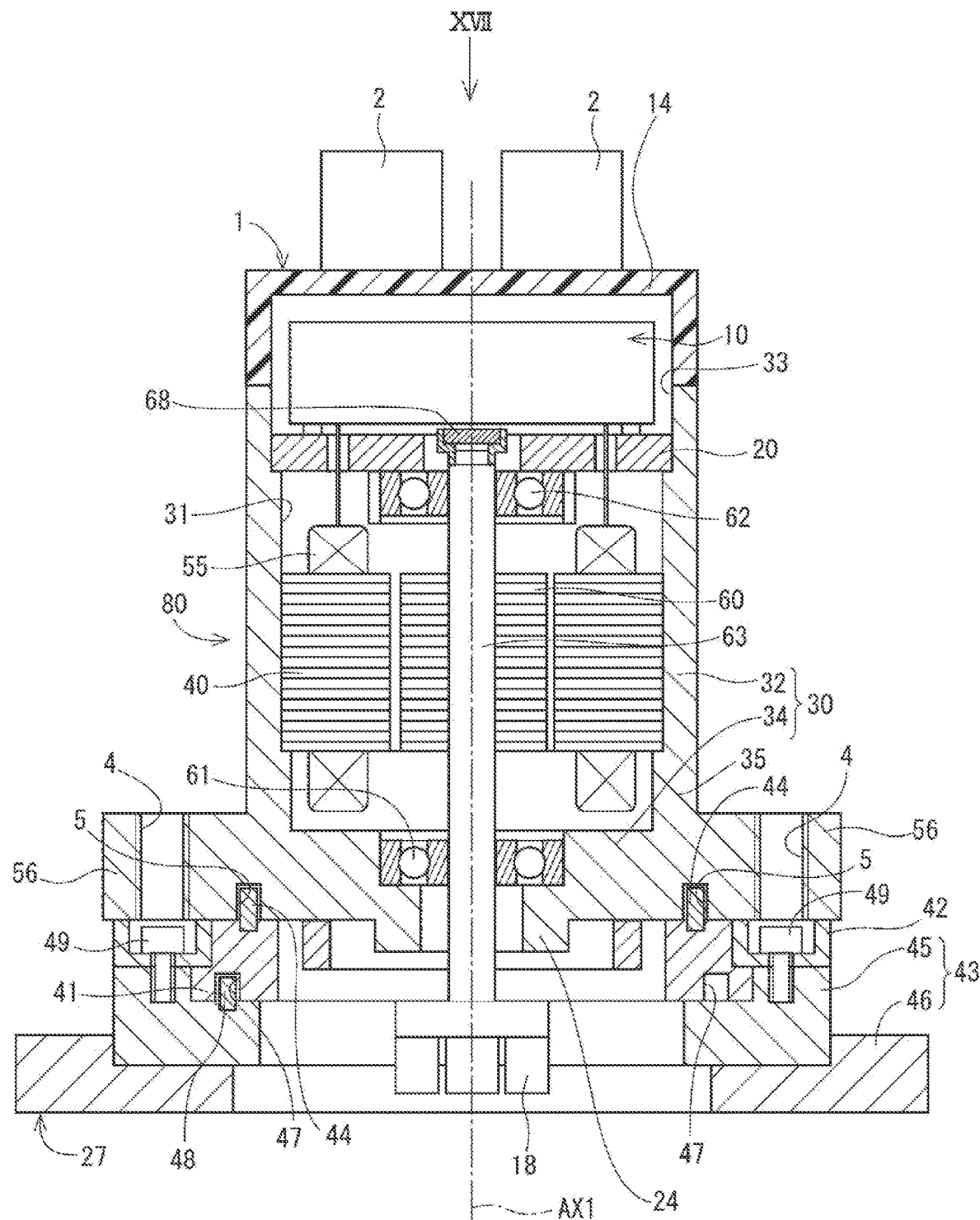
FIG. 16 is a cross-sectional view of the rotary electric machine of FIG. 15 and a pallet mounted with the rotary electric machine of FIG. 15.
Figure 17:
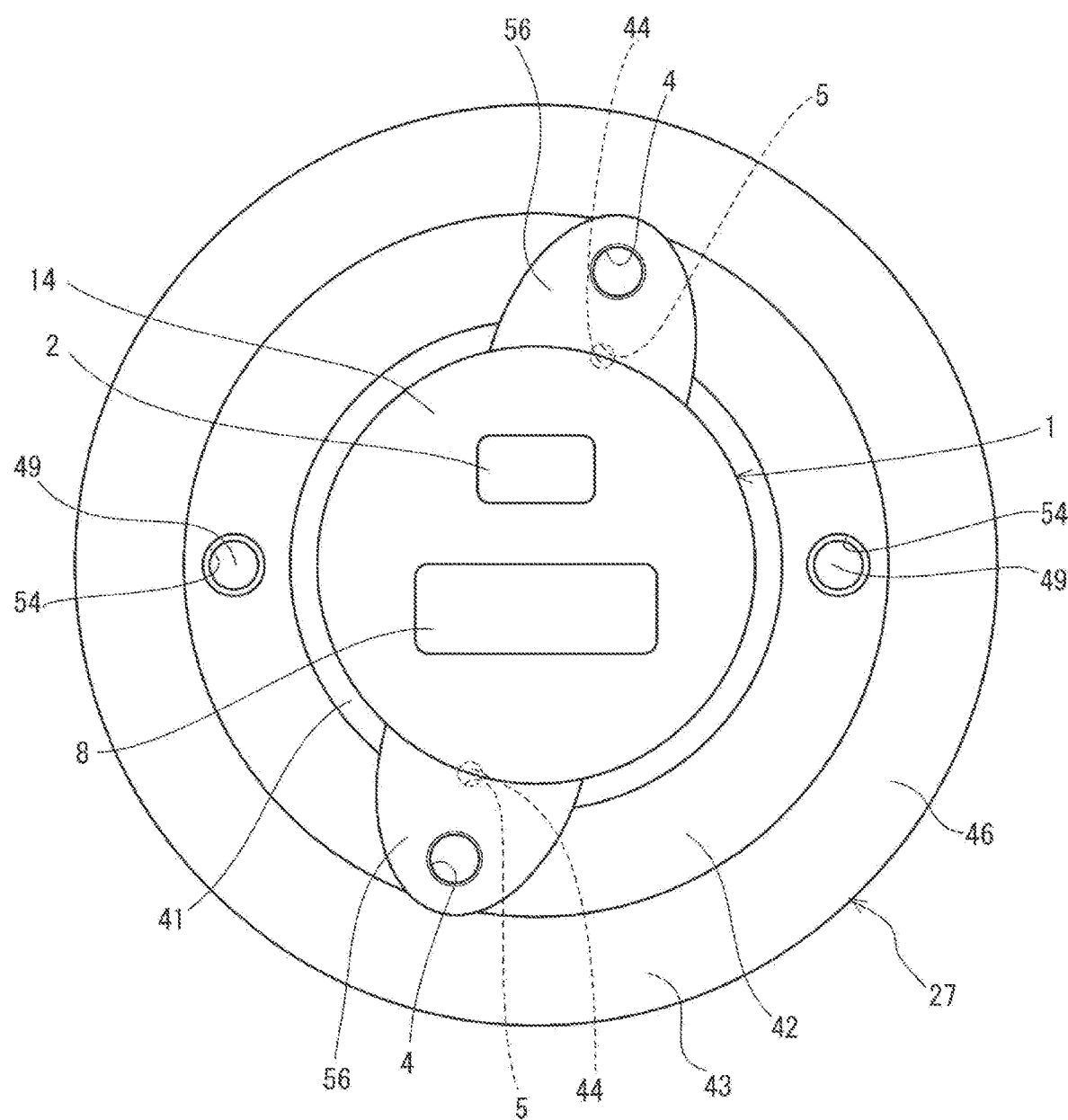
FIG. 17 is a view in a direction of an arrow XVII in FIG. 16, showing the rotary electric machine and the pallet of FIG. 16.

In the present embodiment, as shown in FIGS. 11 and 12, a chuck jig 51, which is used for fixing the housing 30 and is included in a cutting machine used in a cutting step of the housing 30, includes two positioning pins 26. As shown in FIG. 12, the housing 30 is positioned in the circumferential direction when the positioning pins 26 are respectively fitted into the housing positioning holes 5. The positioned housing 30 is rotated in a rotational direction B, and a cutting step of boring a hole having a corresponding inner diameter at the housing 30 is performed with a cutting tool 52 that is operated in a cutting direction A.

Figure 7:
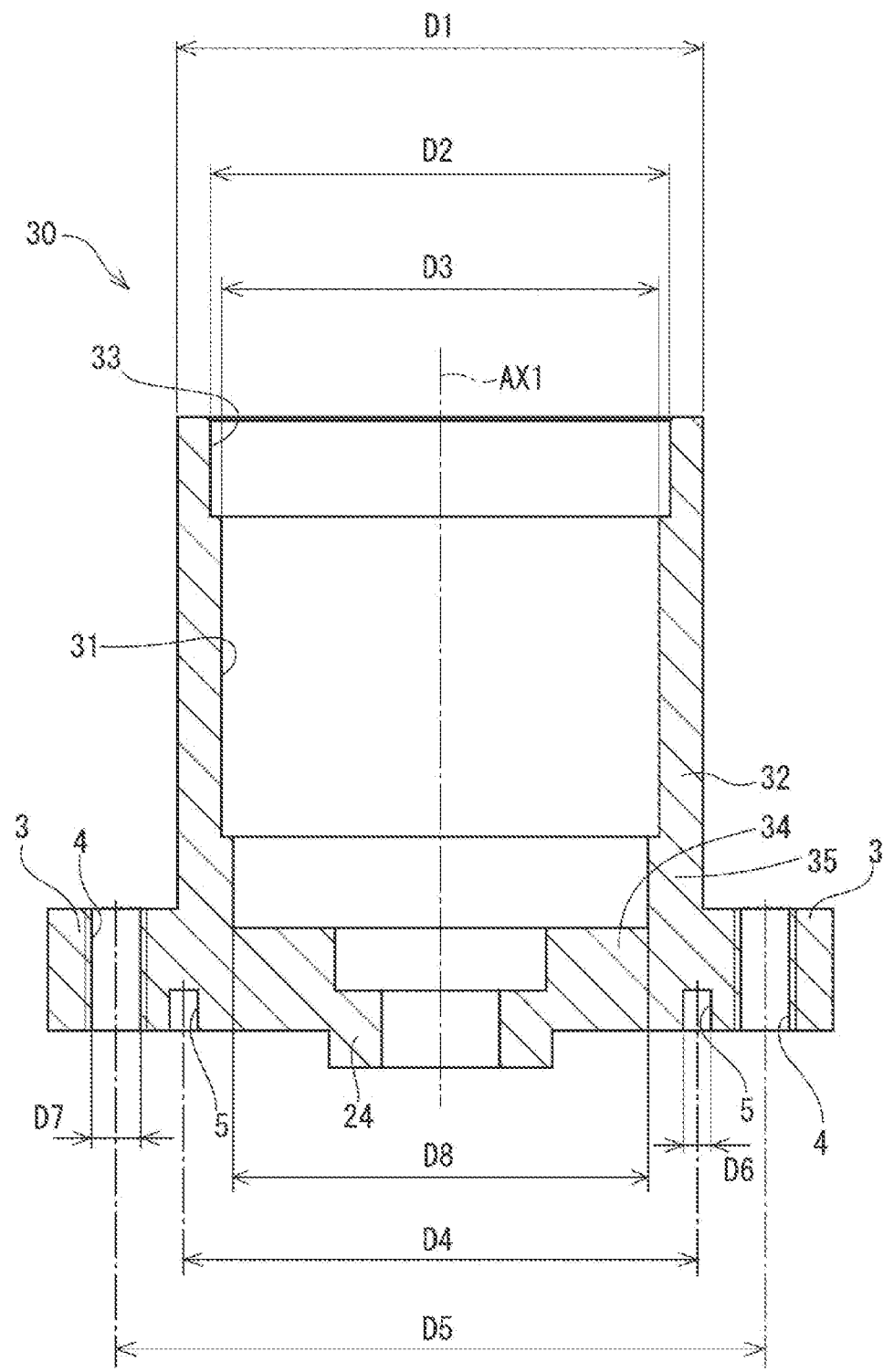
FIG. 7 is a cross-sectional view of a housing of FIG. 5.

As shown in FIG. 7, a pitch circle diameter D4 of the housing positioning holes 5 (i.e., a diameter of a circle which passes through a center of the respective housing positioning holes 5) is larger than an inner diameter D3 of the stator receiving portion 31 and an inner diameter D2 of the heat sink fixing portion 33. Furthermore, the pitch circle diameter D4 is larger than an inner diameter D8 of the bottom-side end portion 35 and is smaller than an outer diameter D1 of the bottom-side end portion 35.

Furthermore, a difference between the pitch circle diameter D4 of the housing positioning holes 5 and an inner diameter D6 of each of the housing positioning holes 5 is larger than the inner diameter D3 of the stator receiving portion 31. Additionally, a sum of the pitch circle diameter D4 of the housing positioning holes 5 and the inner diameter D6 is smaller than a difference between a pitch circle diameter D5 of the gear-side mounting holes 4 (i.e., a diameter of a circle which passes through a center of the respective gear-side mounting holes 4) and an inner diameter D7 of each of the gear-side mounting holes 4.

Figure 5:
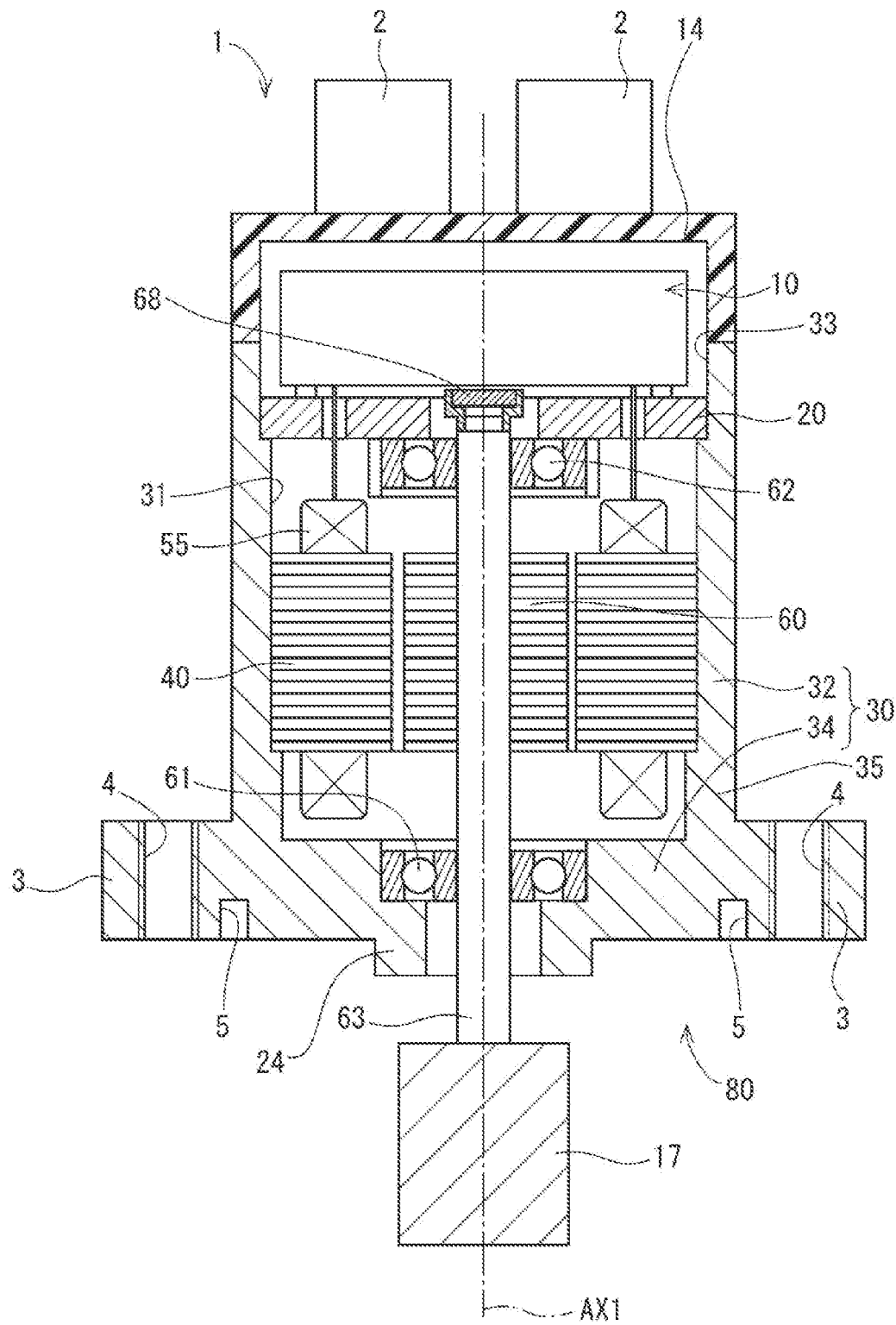
FIG. 5 is a cross-sectional view taken along line V-V in FIG. 4, showing the rotary electric machine of FIG. 4.

As shown in FIG. 5, a heat sink 20 is installed at the opening 33 of the housing 30, which is opposite to the bottom portion 34, such that the heat sink 20 is opposed to a rear-side end surface of the stator 40 and a rear-side end surface of the rotor 60. A rear bearing 62 rotatably supports the shaft 63 at the rear side in the axial direction. The heat sink 20 is fixed by shrink fitting to the heat sink fixing portion 33, which is formed at the inner wall of the tubular portion 32 of the housing 30 shaped in the tubular form, such that the heat sink 20 is positioned at an arbitrary relative angle position around the axis of the tubular portion 32.

The stator 40 is fixed by shrink fitting to the stator receiving portion 31, which is formed at the inner side of the tubular portion 32, such that the stator 40 is positioned at an arbitrary relative angle position around the axis of the tubular portion 32. Windings 55, which form a magnetic field upon energization thereof, are wound around the stator 40. The rotor 60 is located on a radially inner side of the stator 40. The rotor 60 is rotatably arranged on a radially inner side of the stator 40 such that a gap is interposed between the rotor 60 and the stator 40. The rotor 60 includes a plurality of permanent magnets (not shown) arranged along an outer periphery of the rotor 60, and the rotor 60 is rotated about the axis of the shaft 63 by a rotating magnetic field generated at the stator 40 in response to the energization of the windings 55. The shaft 63 is fixed to the rotor 60 and is rotated together with the rotor 60.

The shaft 63, which is fixed to a center of the rotor 60, is rotatably supported by the front bearing 61, which is held by the bottom portion 34 of the housing 30, and the rear bearing 62, which is held by the heat sink 20. The front bearing 61 is installed to a bearing holding portion (bearing holding recess) of the bottom portion 34 that opens toward the stator receiving portion 31 in the axial direction. The small diameter pulley 17, which is configured to transmit rotation, is installed to an end portion of the shaft 63 located at the front side. A sensor magnet 68, which is configured to sense a rotational angle, is installed to another end portion of the shaft 63 located at the rear side. The rotational axis of the shaft 63 is indicated by AX1.

The control device 10 includes a circuit board 15, which is fixed to the heat sink 20, and various electronic components, which are installed to the circuit board 15. Heat, which is generated by the electronic components at the time of energizing the electronic components, is released to the heat sink 20. The control device 10 is located on an opposite side of the heat sink 20, which is opposite to the stator 40, and the control device 10 controls energization of the stator 40. Furthermore, the control device 10 includes a plurality of externally connecting connectors (hereinafter referred to as connectors) 2 and a cover 14.

The cover 14 covers the opening 33 of the housing 30 located at the rear side of the housing 30. A power supply cable and a signal cable are connected from the outside to the connectors 2. Power supply terminals of the corresponding connector 2 are connected to the circuit board 15 through a path (not shown). A relative angle of the respective connectors 2 relative to the housing 30 in the circumferential direction about the rotational axis AX1 is set to a corresponding predetermined angle that is set to correspond to the model of rotary electric machine and is set in view of a corresponding installation space of the vehicle.

Figure 6:
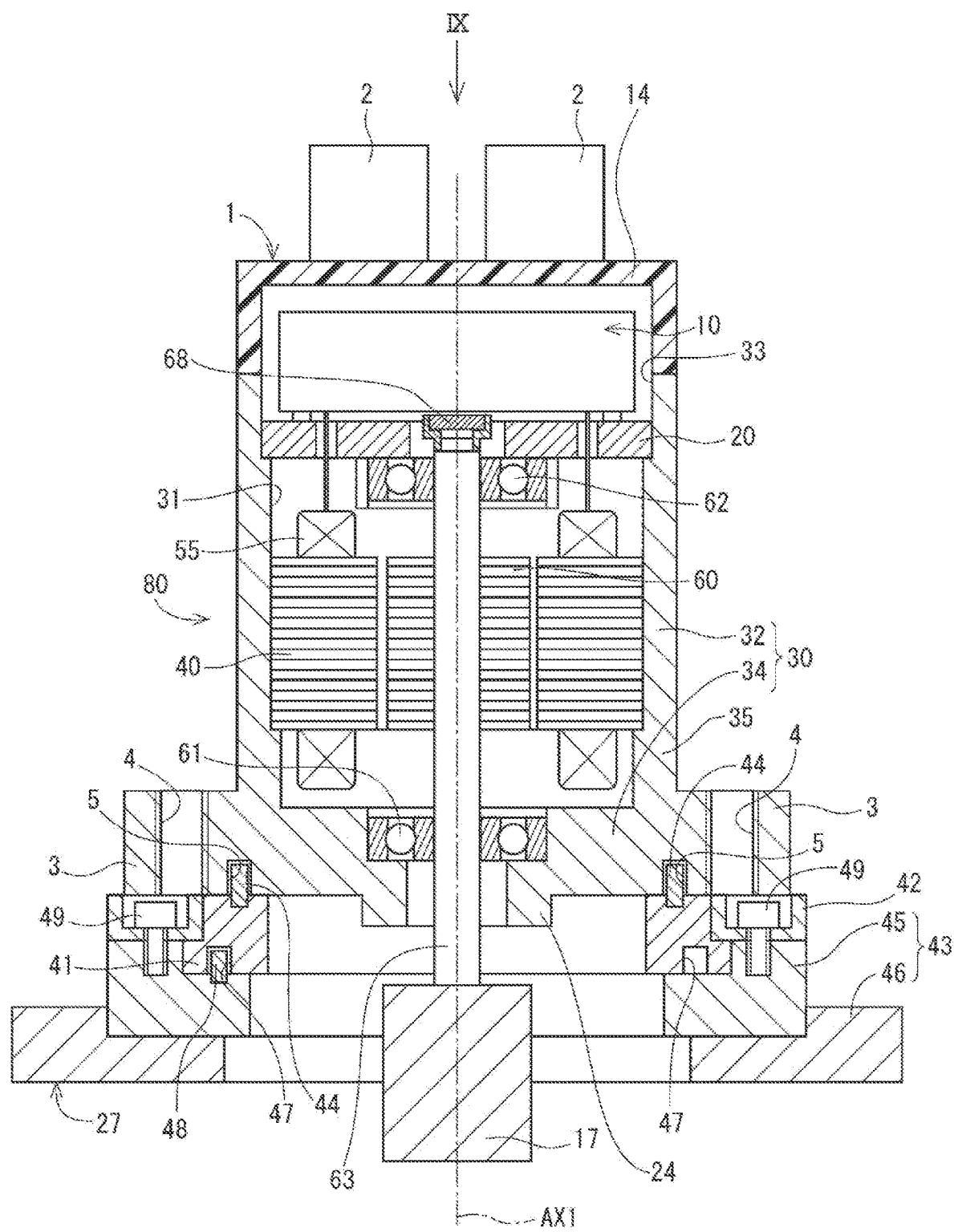
FIG. 6 is a cross-sectional view of the rotary electric machine of FIG. 5 and a pallet mounted with the rotary electric machine of FIG. 5.
Figure 8:
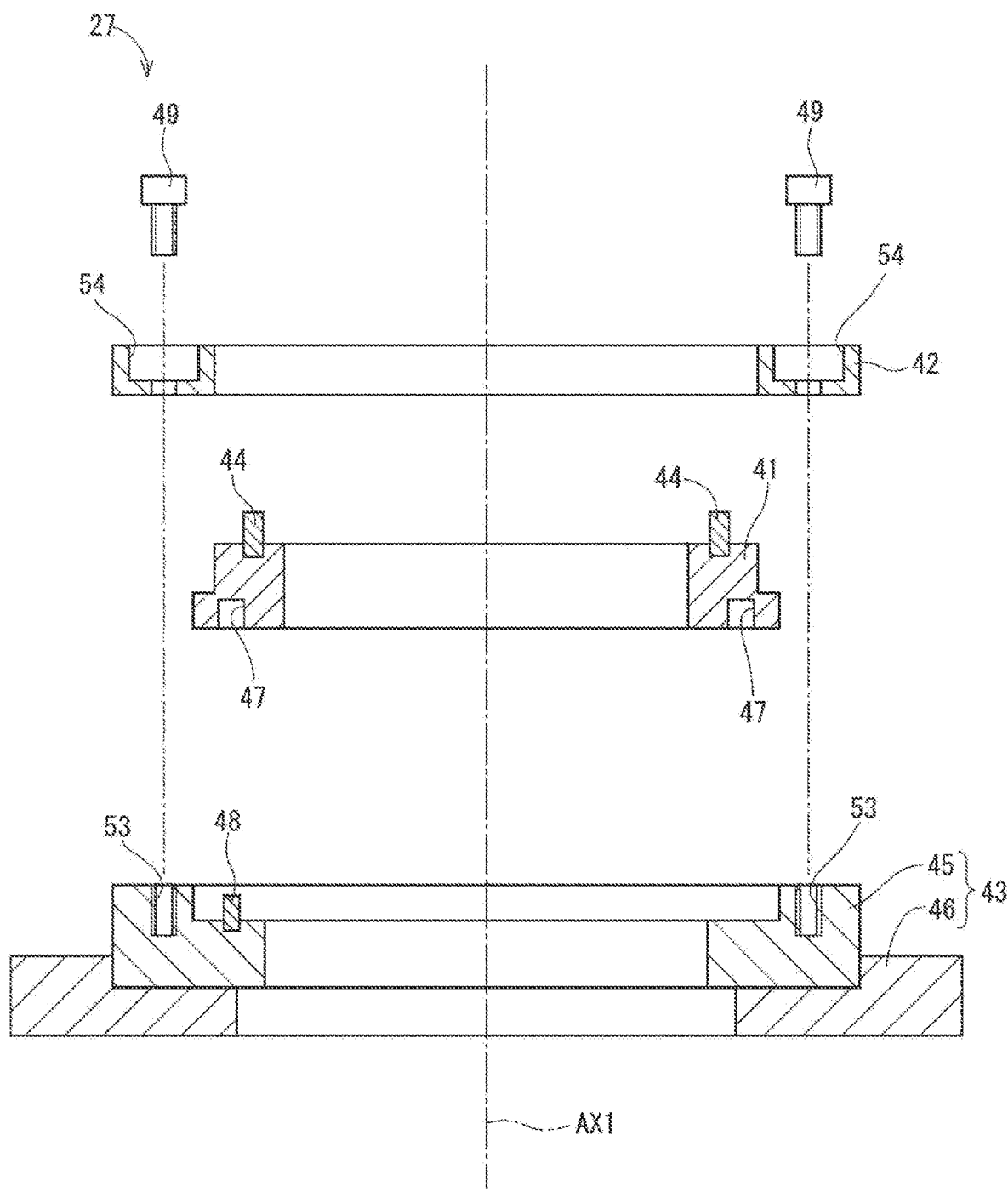
FIG. 8 is an exploded view of the pallet of FIG. 6.

At an assembling step, as shown in FIG. 6, the rotary electric machine 1 is set on a pallet 27. As shown in FIGS. 6 and 8, the pallet 27 includes a housing receiving portion 41, a holding portion 42 and a base portion 43. The base portion 43 includes an upper base portion 45 and a lower base portion 46. At the pallet 27, the lower base portion 46, the upper base portion 45, the housing receiving portion 41 and the holding portion 42 are arranged in this order in the axial direction from the opposite side that is opposite to the rotary electric machine 1 set on the pallet 27.

A plurality of housing positioning pins 44 are installed at an upper surface of the housing receiving portion 41. The number of the housing positioning pins 44 is two, and these two housing positioning pins 44 are installed at two locations, which are opposed to each other and are circumferentially displaced from each other by 180 degrees, such that the housing positioning pins 44 are fitted into the housing positioning holes 5, respectively. A plurality of pallet positioning holes 47 are formed at a lower surface of the housing receiving portion 41. The number of the pallet positioning holes 47 is seventy two, and these seventy two pallet positioning holes 47 are arranged at equal intervals, i.e., 5 degree intervals along a common circle.

A pallet positioning pin 48 is installed at the upper base portion 45. The pallet positioning pin 48 is inserted into one of the pallet positioning holes 47. Furthermore, the upper base portion 45 includes two pallet fixing screw holes 53, and the holding portion 42 includes two holding portion holes 54. Each of two pallet fixing screws 49 is inserted through a corresponding one of the holding portion holes 54 and is threadably engaged with a corresponding one of the pallet fixing screw holes 53 to fix the holding portion 42 and the base portion 43 together such that the housing receiving portion 41 is clamped between the holding portion 42 and the base portion 43.

The pallet positioning holes 47 enable a change in a relative angle position of the housing receiving portion 41 relative to the base portion 43 through rotation of the housing receiving portion 41 about the rotational axis AX1. When the corresponding relative angle position of the respective pallet positioning holes 47 relative to the upper base portion 45 is changed, the corresponding relative angle position of the respective housing positioning pins 44 relative to the upper base portion 45 is changed. Hereinafter, a mechanism for changing the relative angle position of the respective housing positioning pins 44 relative to the upper base portion 45 will be referred to as a rotating mechanism of the pallet 27.

Figure 9:
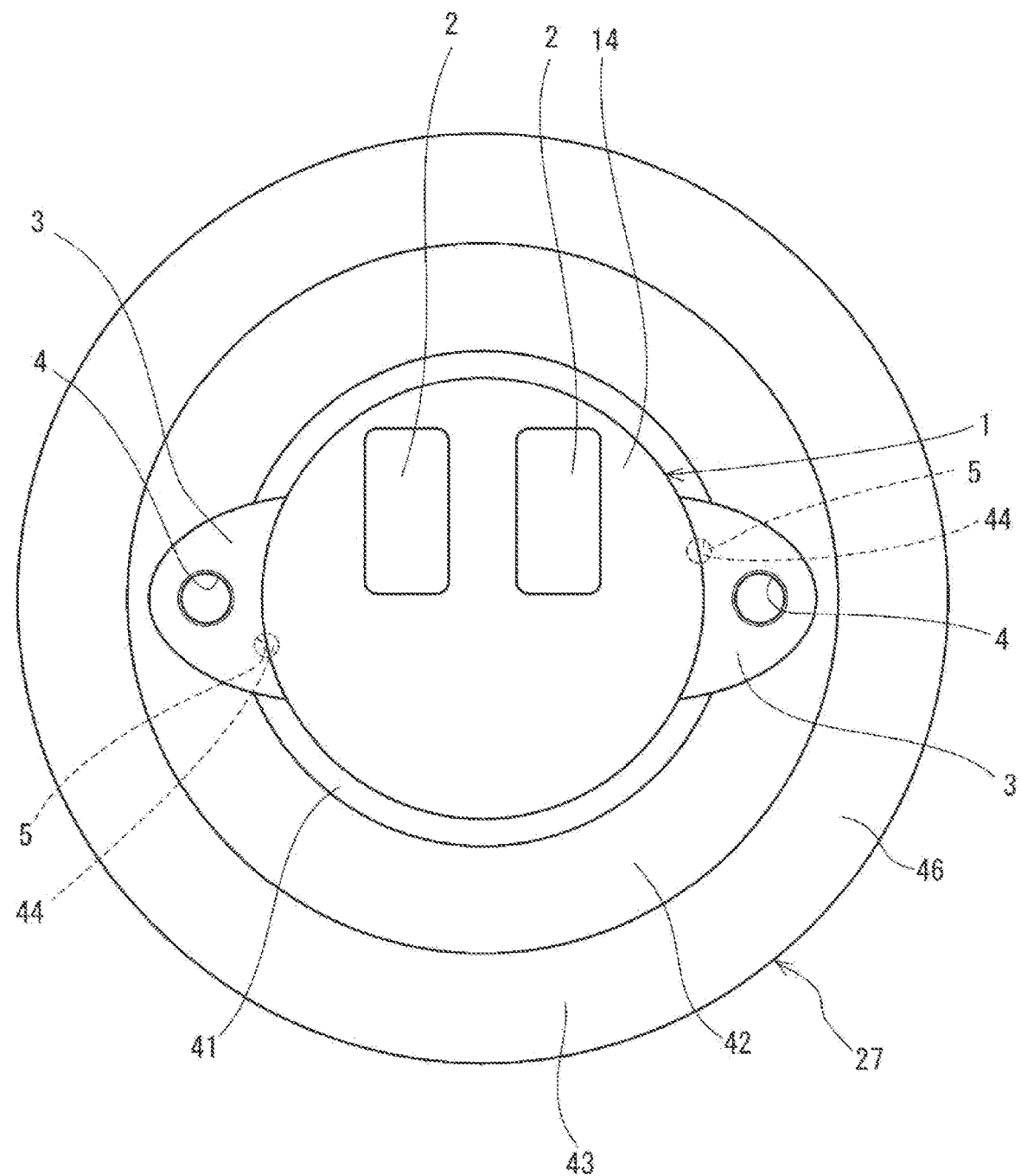
FIG. 9 is a view in a direction of an arrow IX in FIG. 6, showing the rotary electric machine and the pallet of FIG. 6.
Figure 10:
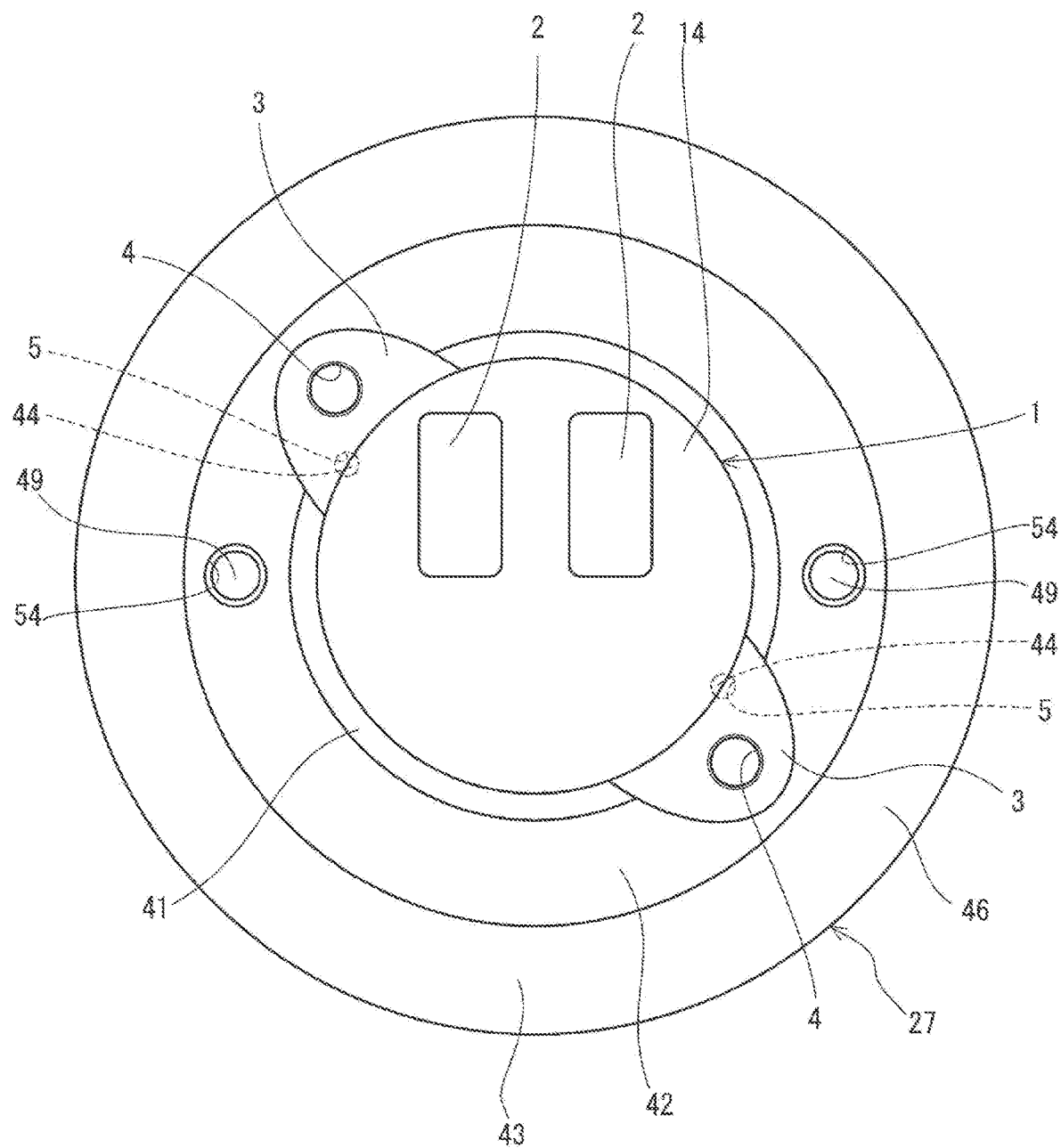
FIG. 10 is a plan view of a rotary electric machine and a pallet according to a first modification of the first embodiment corresponding to FIG. 9.

Since a fixing position of each of the stator 40 and the heat sink 20 around the axis can be changed, the rotary electric machine 1 has a high degree of freedom in a corresponding relative angle between the respective gear-side mounting portions 3 and the respective connectors 2 around the axis. A first modification shown in FIG. 10 is changed from the first embodiment shown in FIG. 9 with respect to a corresponding relative angle between the respective gear-side mounting portions 3 and the respective connectors 2 around the axis. As shown in FIGS. 9 and 10, the corresponding relative angle position of the respective housing positioning pins 44 relative to the upper base portion 45 is set to correspond with the corresponding relative angle between the respective gear-side mounting portions 3 and the respective connectors 2 of the rotary electric machine 1. The housing positioning holes 5 are commonly set regardless of the model of rotary electric machine to be assembled, so that different types of rotary electric machines, in each of which the corresponding relative angle between the respective gear-side mounting portions 3 and the respective connectors 2 is set differently, can be manufactured by using the rotating mechanism of the pallet 27 at a common assembling facility.

Figure 18:
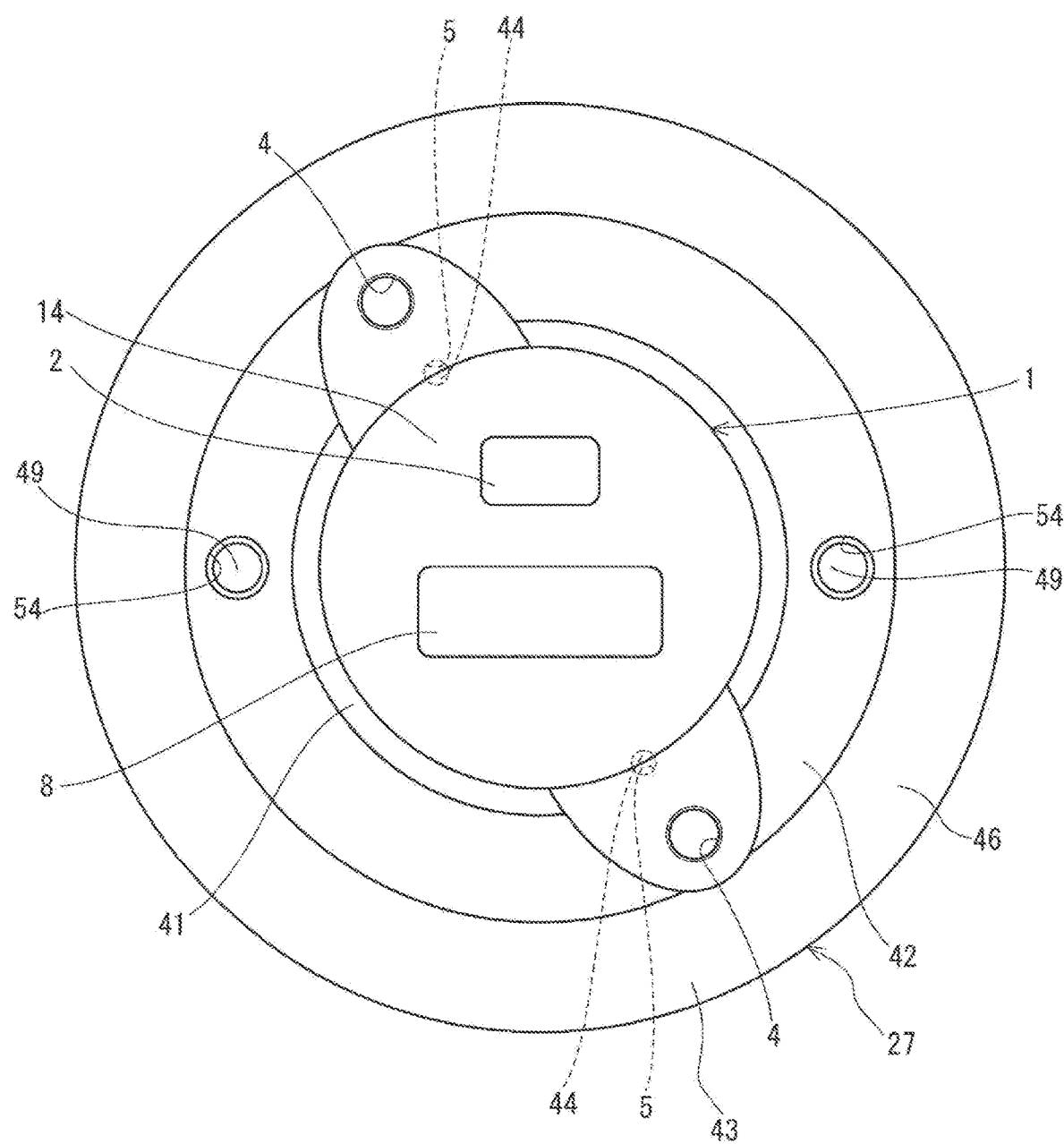
FIG. 18 is a plan view of a rotary electric machine and a pallet according to a third modification of the first embodiment corresponding to FIG. 9.

In a second modification shown in FIGS. 13 to 17 and a third modification shown in FIG. 18, a drive force transmission member is a joint 18. When the second modification and the third modification are compared with the first embodiment, it is understood that each of the gear-side mounting portions 56 is further lengthened toward the radially outer side in comparison to each of the gear-side mounting portions 3. Specifically, the shape of each of the gear-side mounting portions 56 is different from the shape of each of the gear-side mounting portions 3.

However, in the first embodiment and the first to third modifications, the pitch circle diameter of the housing positioning holes 5 is identically set. In the second modification and the third modification, the number of the housing positioning holes 5 is two, and these two housing positioning holes 5 are located at the two locations that are opposed to each other and are circumferentially displaced from each other by 180 degrees like in the first embodiment.

Previously, in order to fix the housing 30 at an arbitrary relative angle position to variably assembly the housing 30 at a corresponding relative angle that varies depending on the model of rotary electric machine, the externally mounting portions 3, 56, which project from the tubular portion 32, are chucked, or pins are inserted into the externally mounting holes 4 which are for externally mounting the rotary electric machine. However, if, for example, the shapes, sizes and or positions of the externally mounting portions 3, 56 and the externally mounting holes 4 differ depending on the model of rotary electric machine, there will be increased variations in the fixing jig for fixing the housing 30 at the corresponding relative angle position at each assembling device, and it will take a long time to set up, resulting in inefficiency.

In contrast, even in the case where the shapes of the respective gear-side mounting portions 3, 56 differ among the various models of rotary electric machines like in the first embodiment and the first to third modifications, the Jig 51, 27, which fixes the housing 30 at the manufacturing process, can be used common among the various models of rotary electric machines by commonly setting the housing positioning holes 5 regardless of the model of rotary electric machine to be assembled.

Advantages

In the first embodiment, the gear-side mounting portions 3 and the housing 30 are integrally formed in one-piece, so that it is not necessary to provide a fixing member for fixing the gear-side mounting portions 3 to the housing 30. Furthermore, the heat sink 20 and the stator 40 are fixed at the inner side of the housing 30, so that it is not necessary to provide a fixing member for fixing, for example, the stator 40 at the outer side of the housing 30. Thus, the number of the projections, which are located at the outer side of the housing 30, is reduced.

Furthermore, since the housing 30 is shaped in the tubular form, the silhouette of the housing 30 does not change even when the housing 30 is rotated. Furthermore, each of the heat sink 20 and the stator 40 is fixed to the housing 30 at the arbitrary relative angle position, so that there is the high degree of freedom in the relative angle between the respective gear-side mounting portions 3 and the respective connectors 2. Therefore, it is possible to increase the degree of mounting freedom of the rotary electric machine 1.

Furthermore, in the first embodiment, the gear-side mounting portions 3 respectively include the housing positioning holes 5 which are arranged at equal intervals along the circle that is concentric with the tubular portion 32. The Jig, which fixes the housing 30 at the manufacturing process, can be used common among the various models of rotary electric machines by commonly setting the housing positioning holes 5 regardless of the model of rotary electric machine to be assembled.

At the cutting step of the housing 30, the chuck jig 51 can be used common among the various models of rotary electric machines by using the housing positioning holes 5 to position the housing 30 in the rotational direction.

At the assembling step for assembling the components to the housing 30, the housing 30 is positioned in the rotational direction by fitting the housing positioning holes 5 to the housing positioning pins 44 while using the pallet 27 which enables the fixation of the housing positioning pins 44 relative to the base portion 43 at the arbitrary relative angle. Thus, the pallet 27 can be used commonly among the various models of rotary electric machines. After the housing 30 is fixed to the pallet 27 at the arbitrary relative angle that corresponds to the model of rotary electric machine to be assembled, the pallet 27 is transferred to each assembling facility to assemble and process each corresponding component. At each assembling facility, the housing 30 and each corresponding component are not rotated.

By providing the rotating mechanism described above to the pallet 27, the rotating mechanism and the drive force are not required at the assembling facility, so that the assembling facility can have the structure that can be easily adjusted and can be low cost. Furthermore, it is only required to fix relative angle of the housing 30 by operating the pallet 27 only at the time of starting the assembling step, and the pallet 27 does not need to have the drive force for rotating the pallet 27. Thus, the pallet 27 can have the structure that is simple and is low cost.

As described above, according to the rotary electric machine 1 of the present embodiment, it is possible to change the corresponding relative angle between the respective gear-side mounting portions 3 and the respective connectors 2 while limiting the complication in the setup at the manufacturing facility. Thus, it is possible to provide the rotary electric machine 1 that has the high degree of mounting freedom and can be easily manufactured.

Furthermore, in the first embodiment, each of the gear-side mounting portions 3 is the projection that projects from the housing 30 in the radial direction. When the bottom portion 34 is viewed in the axial direction, each of the housing positioning holes 5 is located on the side of the corresponding common tangent line L, at which the axis of the tubular portion 32 is placed, while the corresponding common tangent line L is tangent to and is common to both of the tubular portion 32 and the adjacent one of the gear-side mounting portions 3 which is adjacent to the housing positioning hole 5. Therefore, it is not required to provide a dedicated projection that projects from the tubular portion 32 in the radial direction for each of the housing positioning holes 5. Thus, it is possible to obtain the housing positioning holes 5, which increase the assembling accuracy of the housing 30 relative to the pallet 27 without increasing the silhouette of the housing 30.

In particular, each of the housing positioning holes 5 is provided at the root of the corresponding one of the gear-side mounting portions 3. Thus, since the housing positioning holes 5 are located on the radially outer side in comparison to a case where the housing positioning holes 5 are located at or around the center of the bottom portion 34, the assembling accuracy is increased.

The pitch circle diameter D4 of the housing positioning holes 5 is larger than the inner diameter D3 of the stator receiving portion 31 and the inner diameter D2 of the heat sink fixing portion 33. Therefore, even when the components, such as the stator 40 and the heat sink 20, are press fitted into the housing 30 through the opening 33 in the state where the housing positioning pins 44 are fitted into the housing positioning holes 5, only a moment of force directed toward the center is exerted. Thus, the housing 30 is less likely tilted.

Furthermore, by providing the housing positioning holes 5 on the outer side of the inner diameter D8 of the bottom-side end portion 35 in the radial direction, it is possible to limit bending of the bottom portion 34 at the time of processing the housing positioning holes 5. Thus, the position accuracy of the housing positioning holes 5 is improved.

Furthermore, the difference between the pitch circle diameter D4 of the housing positioning holes 5 and the inner diameter D6 of each of the housing positioning holes 5 is larger than the inner diameter D3 of the stator receiving portion 31. Thus, the radial position of the stator 40 and the radial position of each of the housing positioning pins 44 do not overlap with each other. Therefore, since the stator 40 can be arranged on the front side as much as possible, the size of the rotary electric machine 1 can be miniaturized.

The pitch circle diameter D4 of the housing positioning holes 5 is smaller than the outer diameter D1 of the bottom-side end portion 35. By providing the housing positioning holes 5 on the inner side of the outer diameter D1 of the bottom-side end portion 35 in the radial direction, it is possible to limit warping of the gear-side mounting portions 3 at the time of processing the housing positioning holes 5. Thus, the position accuracy of the housing positioning holes 5 is improved.

The sum of the pitch circle diameter D4 of the housing positioning holes 5 and the inner diameter D6 of each of the housing positioning holes 5 is smaller than the difference between the pitch circle diameter D5 of the gear-side mounting holes 4 and the inner diameter D7 of each of the gear-side mounting holes 4. Thus, the radial position of each of the housing positioning holes 5 and the radial position of each of the gear-side mounting holes 4 do not overlap with each other. Therefore, each of the housing positioning holes 5 can be placed at an arbitrary position regardless of the position of each of the gear-side mounting holes 4.

The bottom portion 34 includes the ring-shaped projection 24 that is coaxial with the tubular portion 32. The ring-shaped projection 24 is located on the radially inner side of the housing positioning holes 5 and projects toward the opposite side that is opposite to the tubular portion 32. Therefore, the center positioning of the tubular portion 32 can be performed with high accuracy by using the ring-shaped projection 24.

Second Embodiment

Figure 19:
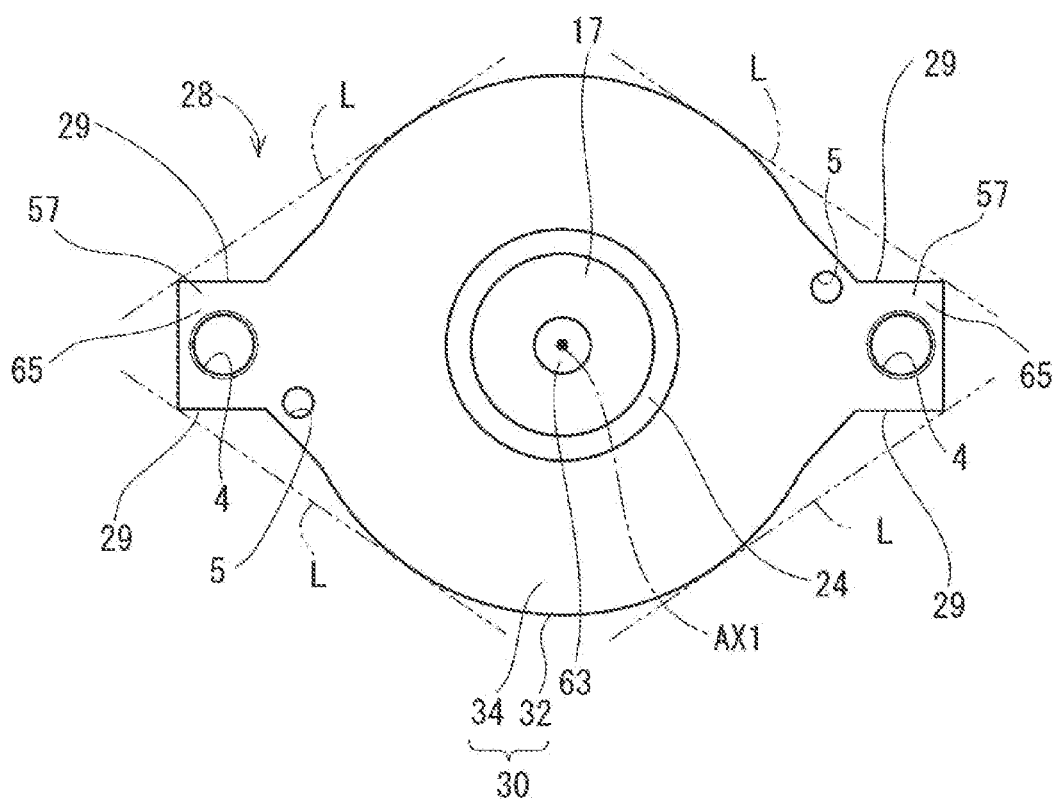
FIG. 19 is a view of a rotary electric machine according to a second embodiment as viewed from a front side of the rotary electric machine, corresponding to FIG. 4 of the first embodiment.

In a second embodiment, as shown in FIG. 19, each of the gear-side mounting portions 57 of the rotary electric machine 28 includes a two-sided portion 65 that has a pair of flat surfaces 29 provided at two opposed sides of the two-sided portion 65, which are opposed to each other, while the pair of flat surfaces 29 extend in the radial direction of the tubular portion 32 in parallel with each other. The two-sided portions 65 can be used as a chuck until the time of processing the housing positioning holes 5. By commonly using the two-sided portions 65 regardless of the model of rotary electric machine to be assembled, the jig, which fixes the housing 30 at the manufacturing process, can be used commonly among the various models of rotary electric machines.

Other Embodiments

In another embodiment, the number of the housing positioning holes should not be limited to two and can be three or more. In short, the housing positioning holes are arranged at the equal intervals along the circle that is concentric with the tubular portion of the housing, and it may be only required that the pitch circle diameter of the housing positioning holes and the positional relationship among the housing positioning holes are identically set even among the different models of rotary electric machines.

In another embodiment, the number of the pallet positioning holes should not be limited to seventeen two while these pallet positioning holes are arranged at 5 degree intervals. In short, the number of the pallet positioning holes can be arbitrarily set as long as the pallet positioning holes are arranged at equal intervals along a common circle.

In another embodiment, the number of the pallet positioning pin(s) provided at the base portion should not be limited to one and may be two or more. In short, it is only required that the one or more pallet positioning pins fix the rotational position of the pallet while the one or more pallet positioning pins are arranged to correspond to the pallet positioning holes arranged along the common circle at the lower surface of the housing receiving portion.

In another embodiment, the shape, the size and the position of the respective gear-side mounting holes may vary among the different models of rotary electric machines. In short, it is only required that the housing positioning holes are commonly set regardless of the model of rotary electric machine to be assembled.

In another embodiment, the housing positioning holes may be entirely formed at the gear-side mounting portion or may be displaced entirely from the gear-side mounting portion. In short, it is only required that the housing positioning holes are formed at the bottom portion by using the gear-side mounting portions and are located on the radially outer side in comparison to the case where the housing positioning holes are located at or around the center of the bottom portion.

In another embodiment, the two-sided portion may be formed at only one of the externally mounting portions.

The present disclosure has been described with reference to the embodiments. However, the present disclosure should not be limited to the above-described embodiments and the structures described therein. The present disclosure should cover various modifications and modifications within an equivalent range. Also, various combinations and forms, as well as other combinations and forms that include only one element, more, or less, are within the scope and ideology of the present disclosure.

What is claimed is:

1. A rotary electric machine comprising:
a housing that is shaped in a bottomed tubular form;
a stator that is fixed to a stator receiving portion that is formed at an inner wall of a tubular portion of the housing, at an arbitrary angle position around an axis of the tubular portion;
a heat sink that is fixed to a heat sink fixing portion that is formed at the inner wall of the tubular portion, at an arbitrary angle position around the axis of the tubular portion;
a control device that includes a connector for electrically connecting with an external device and is configured to control energization of the stator;
an externally mounting portion that is a part of a bottom portion of the housing and is formed integrally with the housing in one-piece; and
a plurality of housing positioning holes that are formed at the bottom portion and are arranged at equal intervals along a circle that is concentric with the tubular portion, wherein:
the control device is installed at one side of the housing, wherein at said one side an opening of the housing opens;
a bearing that rotatably supports a shaft and is installed at the bottom portion;
the externally mounting portion projects radially outward at the bottom portion; an end surface of the bottom portion is configured to contact a gear housing; and
each of the plurality of housing positioning holes is a recess that is formed at the bottom portion and opens at a contact surface of the bottom portion that is configured to contact the gear housing.

2. The rotary electric machine according to claim 1, wherein:
the externally mounting portion is one of a plurality of externally mounting portions; and
in an axial view, each of the plurality of housing positioning holes is located on a side of a corresponding common tangent line, wherein the axis of the tubular portion is placed at said common tangent line, while the corresponding common tangent line is tangent to and is common to both of the tubular portion and an adjacent one of the plurality of externally mounting portions that is adjacent to the housing positioning hole.

3. The rotary electric machine according to claim 1, wherein a pitch circle diameter of the plurality of housing positioning holes is larger than an inner diameter of the stator receiving portion and an inner diameter of the heat sink fixing portion.

4. The rotary electric machine according to claim 1, wherein a pitch circle diameter of the plurality of housing positioning holes is larger than an inner diameter of an end portion of the tubular portion located adjacent to the bottom portion.

5. The rotary electric machine according to claim 1, wherein a difference between a pitch circle diameter of the plurality of housing positioning holes and an inner diameter of each of the plurality of housing positioning holes is larger than an inner diameter of the stator receiving portion.

6. The rotary electric machine according to claim 1, wherein a pitch circle diameter of the plurality of housing positioning holes is smaller than an outer diameter of an end portion of the tubular portion located adjacent to the bottom portion.

7. The rotary electric machine according to claim 1, wherein:
the externally mounting portion is one of a plurality of externally mounting portions;
each of the plurality of externally mounting portions include a corresponding one of a plurality of externally mounting holes, wherein each of said plurality of externally mounting holes serves as a hole for externally mounting the rotary electric machine;
the plurality of externally mounting holes are arranged at equal intervals along a circle that is coaxial with the tubular portion; and
a sum of a pitch circle diameter of the plurality of housing positioning holes and an inner diameter of each of the plurality housing positioning holes is smaller than a difference between a pitch circle diameter of the plurality of externally mounting holes and an inner diameter of each of the plurality of externally mounting holes.

8. The rotary electric machine according to claim 1, wherein:
the bottom portion includes a ring-shaped projection that is coaxial with the tubular portion; the ring-shaped projection is located on a radially inner side of the plurality of housing positioning holes and projects toward a side that is opposite to the tubular portion; the bearing is installed at a bearing holding portion of the bottom portion that opens toward the stator receiving portion;
and the ring-shaped projection is spaced from the bearing holding portion in an axial direction and projects from a bottom surface of the bottom portion in the axial direction.

9. The rotary electric machine according to claim 1, wherein:
the externally mounting portion is one of a plurality of externally mounting portions; and
at least one of the plurality of externally mounting portions includes a two-sided portion that has a pair of flat surfaces that are respectively formed at two sides of the two-sided portion that are opposed to each other, and the pair of flat surfaces are parallel to a radial direction of the tubular portion.

* * * * *